July 25, 1967  J. A. ROBINSON  3,333,093
UNIVERSAL LIGHT HOLDER AND FILTER ACTUATOR
Filed Sept. 22, 1965

INVENTOR
JACK A. ROBINSON
BY Mullin and Alter
ATTORNEYS

United States Patent Office 3,333,093
Patented July 25, 1967

3,333,093
UNIVERSAL LIGHT HOLDER AND FILTER ACTUATOR
Jack A. Robinson, Chicago, Ill., assignor to Acme-Lite Manufacturing Co., Chicago, Ill., a corporation of Illinois
Filed Sept. 22, 1965, Ser. No. 489,128
8 Claims. (Cl. 240—1.3)

This invention relates to a universal light holder and filter actuator and more particularly relates to a universal light holder and filter actuator for eliminating the outdoor filter in Super 8 cameras when it is desired to use the same indoors with artificial lighting.

With the advent of Super 8 film, which is also referred to as Kodachrome II, sharp definitive pictures may be taken indoors as well as outdoors. Super 8 film, however, has a different frame size and sprocket location from the conventional film heretofore used. Consequently, Super 8 cameras have been constructed for use exclusively with Super 8 film. These Super 8 cameras are equipped with a built-in filter in order to adapt the Super 8 film for use outdoors. The Super 8 cameras, unlike prior cameras, do not have an accessible external mechanism for eliminating the built-in filter when it is desired to use the camera indoors.

Thus, to provide for the use of the Super 8 camera indoors and with artificial light, the camera manufacturers supply their own special light fixture with a suitable mounting structure compatible with the respective cameras which normally serves also as a key to automatically remove the outdoor built-in filter from view.

An undesirable feature of the aforementioned special Super 8 light fixtures, was that a Super 8 light fixture from one manufacturer was not necessarily adaptable for use with a Super 8 camera of another manufacturer. For an example, Super 8 cameras such as those manufactured by Keystone, Argus, Crestline and De Jur provide access to the outdoor built-in filter via a threaded hole which also serves as a mounting hold for a light fixture. Hence, a light fixture for these cameras includes a screw-type mounting which threadedly engages the threaded opening of the camera for securing the light fixture thereto, and also at the same time acting as a filter actuator to remove the built-in outdoor filter from view. On the other hand, Kodak Super 8 cameras as well as some foreign makes, such as Eumig and Yashica provide a light fixture with a plate mounting structure which tightly fits into a slotted opening of the camera. The cooperation of the plate mounting with the slotted opening affords a firm contact and also causes the built-in outdoor filter to swing out from view.

Since a single Super 8 light attachment was not adaptable for all types of Super 8 cameras, dealers and suppliers of cameras and accessories were required to stock both kinds of light fixtures in order to accommodate the needs of the purchaser. Therefore, the necessity of this increased inventory resulted in considerable extra expense. Moreover, camera users which had more than one Super 8 type camera were also required to duplicate light accessories if the filter keyways were different.

It is therefore a primary object of this invention to provide a light holder for an external lamp that may be operatively associated with any conventional Super 8 camera.

It is therefore another primary object of this invention to provide a filter actuator which is adapted to be attached to the conventional Super 8 cameras for disengaging the outdoor built-in filter, and thereby permitting the use of the Super 8 cameras indoors with artificial lighting.

It is another object of this invention to provide a light holder and filter actuator which is adaptable for use with the conventional Super 8 cameras.

It is still another object to afford a light holder and filter actuator to give effective artificial lighting independent of the location provided on the camera for attaching an external clamp.

It is a feature of this invention to provide a plate filter actuator that is pivotally associated with a supporting bracket and is dimensioned to fit tightly within a slotted opening provided in the camera for access to a built-in outdoor filter in order to disengage said outdoor filter.

It is another feature of this invention to provide a screw type filter actuator which is threadedly associated with a threaded hole provided in the camera for access to a built-in outdoor filter, in order to disengage said outdoor filter.

It is another feature of this invention to provide a filter key for Super 8 cameras that includes a plate filter actuator and a screw filter actuator disposed on a bracket whereupon either of said filter actuators may be used.

It is still another feature of this invention to provide a combination light holder and filter actuator whereby the fastening of the filter actuator to the camera disengages the built-in outdoor filter and also secures the light holder to the camera. Suitable coupling means is provided for operatively connecting an external lamp to the holder to provide the artificial light.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of references are employed to indicate corresponding or similar parts throughout the several figures of the drawings.

Figure 1:
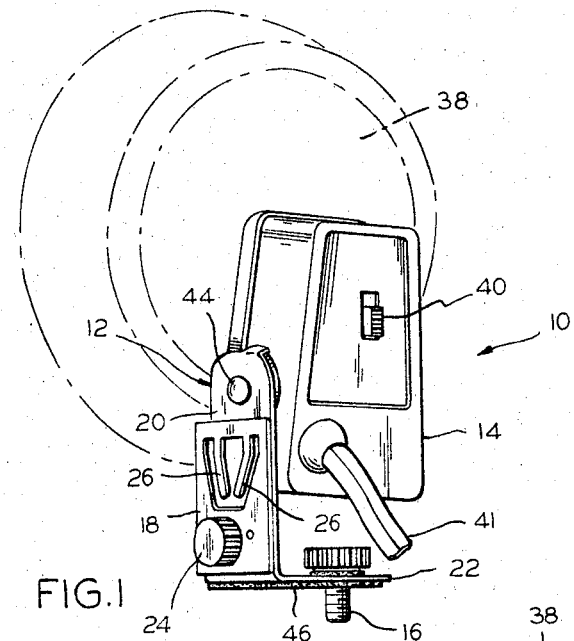
FIG. 1 is a perspective view of the universal light holder and filter actuator embodying the principles of the invention.

Referring to the several figures of the drawing, the reference character 10 indicates generally a universal light holder and filter actuator. The light holder and filter actuator 10, includes a substantially L-shaped bracket 12, a light holder 14, a screw filter actuator 16 and plate filter actuator 18.

Figures 3, 7:
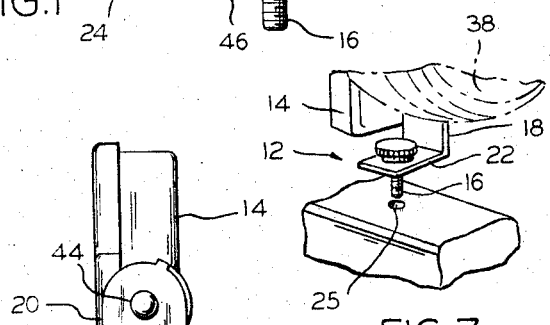
FIG. 3 is a front elevation view similar to FIG. 2 and showing the plate filter actuator in an operative position
FIG. 7 is a perspective view of the screw filter actuator in an operative position and spaced from a receiving hole in the camera.

The L-shaped bracket 12 includes a side wall section 20 and a base section 22. As shown in FIGS. 1 and 3, thumb screw 24 is threadedly associated with the side wa section 20 and serves to releasably secure the plate filter actuator 18 thereto.

The screw filter actuator 16 may be operatively associated with Super 8 cameras which are equipped with a threaded receiving hole 25 (see FIG. 7) wherein access may be obtained to the internal outdoor built-in filter, in order to disengage the same. When the screw filter actuator 16 is tightly positioned inside the threaded receiving hole 25, the outdoor built-in filter (not shown) inside the camera is swung out of view and at the time the light holder 14 is securely associated with the camera.

The plate filter actuator 18 may be operatively associated with Super 8 cameras which have a slotted opening 28 (see FIG. 8) wherein access may be had to the internal built-in filter for the purpose of removing the same from view. The plate actuator 18 includes a pair of prongs 26 which are biased outwardly in order to grip the inside of the slotted opening 28.

Figures 4, 5, 8:
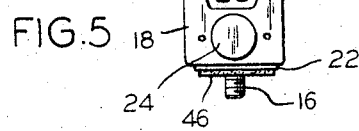
FIG. 4 is a top view of the universal light holder and filter actuator.
FIG. 5 is a side view showing the position of the plate filter actuator when the screw filter actuator is in an operative position.
FIG. 8 is a perspective view of the plate filter actuator in an operative position and spaced from a receiving slotted opening in the camera.
Figure 6:
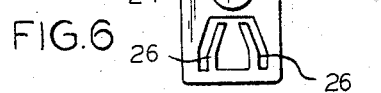
FIG. 6 is a side view similar to FIG. 5, but illustrating the plate filter actuator in an operative position, and showing in phantom the light holder pivoted to a new position.

As shown in FIGS. 6 and 8, the plate filter actuator 18 extends downward from the base section 22 of bracket 12 when in an operative position. Note, that in this operative position the prongs 26 are below the base section. When the plate filter actuator 18 is positioned within the slotted opening 28 of the camera (see FIG. 8) the outdoor built-in filter is swung out of view to permit the use of the camera indoors with artificial lighting. The cooperation of the plate filter actuator 18 with the slotted opening 28 also fixedly secures the light holder 14 to the camera.

The plate filter actuator 18 includes an aperture (not shown) which is slightly larger than the diameter of the shaft portion of the thumb screw 24 which extends therethrough. When the thumb screw is loosened, the plate filter actuator may be rotated (as shown in phantom in FIG. 8) to the operative position illustrated in FIG. 8 or to the in-operative position illustrated in FIG. 5. Note that in the in-operative position the plate filter actuator 18 is above the base section 22 in substantially complete abutment with the side wall 18 of the bracket and therefore offers no interference if the screw filter actuator 16 is desired to be used.

An elongated opening 30 (FIG. 8) is included in the base section 22 wherein the screw filter actuator 16 is removably inserted. The screw filter actuator is also adjustable within the boundary defined by the elongated opening 30.

When the plate filter actuator 18 is in the operative position (FIG. 6), the screw filter actuator 16 may be removed completely from the elongated opening 30. (See FIG. 3.)

Figure 2:
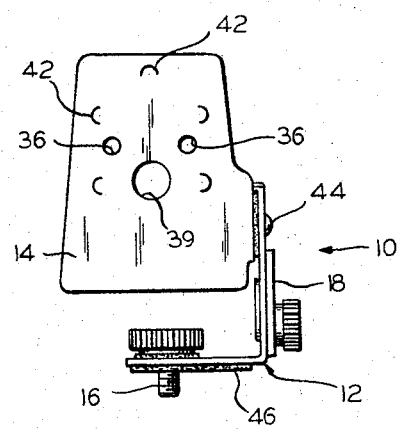
FIG. 2 is a front elevation view of the universal light holder and filter actuator and showing the screw filter actuator in an operative position.

Mounting holes 36 (FIGS. 2 and 3) may be provided on the front side of the light holder 14 for attaching an external lamp 38 (shown in phantom in FIG. 1). The lamp 38 may be electrically associated with the light holder 14 via opening 39. An "on-off" switch 40 (FIG. ) on the back of the light holder 14 may be used to control the electrical power conducted into the light holder by the electrical cable 41.

Dimples 42 may also be provided on the front side of the light holder 14 to insure a smooth contact with an external lamp.

Light holder 14 is rotatably journalled to the side wall section 20 of bracket 12 by a pivot pin 44 (see FIG. 6). In this manner, the position of the light holder and an associated external lamp may be conveniently varied to provide the proper lighting.

A soft pliable pad 46 may be attached to the lower surface of the base section 22 of the bracket 12 to prevent the marring or scratching of a camera surface.

From the foregoing description and drawings, it should be apparent that I have provided a novel universal light holder and filter actuator of greatly simplified and improved construction which accomplishes the aforestated objects and features in a remarkably unexpected fashion.

The invention herein is specifically suitable for providing a universal light attachment and filter actuator for Super 8 cameras. For those Super 8 cameras which provide a threaded hole for an entrance way to a built-in outdoor filter, the light holder and filter actuator herein includes a screw attachment which removes the outdoor filter from view when screwed into the threaded hole and at the same time securely associates the light holder with the camera. For those Super 8 cameras which provide an entrance way through a slotted opening, the light holder and filter actuator herein includes a plate attachment which removes the outdoor filter from view when positioned within the slotted opening and at the same time securely associates the light holder with the camera.

Moreover, the screw filter actuator 16 and the plate filter actuator 18 are associated with the supporting bracket 12 so that if one filter actuator is to be used, the other filter actuator may be suitably adjusted to an inoperative position.

Furthermore, the screw attachment may be used solely to fixedly associate the light holder to the camera for those Super 8 cameras (such as the Super 8 cameras of Bell and Howell), which do not provide an entrance way via the aforementioned threaded hole or slotted opening.

Moreover, the light holder 14, is rotatably journalled to the supporting bracket 12 to enable the position of the holder and the external lamp attached thereto to be conveniently varied as desired.

Furthermore, the light holder and filter actuator herein may be coupled to a conventional Super 8 camera and give effective artificial lighting independent of the location provided thereon for attaching an external lamp.

Although the universal light holder and filter actuator of this invention was described with Super 8 cameras and is particularly suitable for the same, it should be understood that it could be used with other type cameras having similar receiving structure for external accessories.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

I claim:
1. A universal light holder and filter actuator for cameras having a built-in filter that is actuated from within a slotted opening or threaded hole comprising:
   a support bracket;
   a plate filter actuator disposed on said support bracket and sized, to fit within said slotted opening of the camera;
   securing means for releasably securing said plate filter actuator to said support bracket;
   a screw filter actuator associated with said support bracket and being disposed and dimensioned to screw into said threaded hole of said camera, said plate filter actuator having an in-operative position to permit said screw filter actuator to be used, said screw filter actuator having an operative position to permit said plate filter actuator to be used, said filter actuators being capable of disengaging said built-in filter to permit the use of said camera indoors and with artificial lighting; and
   a light holder associated with said support bracket for connecting an external lamp thereto to be used after either said plate filter actuator or said filter actuator has disengaged said built-in filter.

2. A universal light holder and filter actuator as defined in claim 1 wherein said light holder is rotatably journalled to said supporting bracket to permit the position of said holder and said external lamp associated therewith to be varied.

3. A universal light holder and filter actuator as defined in claim 1, wherein said plate filter actuator has an operative position whereby it extends outward from said supporting bracket to be inserted within said slotted opening of the camera, said plate filter actuator being rotatably associated with said support bracket to enable said plate filter actuator to go from said operative to said in-operative position, said plate filter actuator being rigidly associated with said supporting bracket in either of said positions.

4. A universal light holder and filter actuator as defined in claim 3, wherein said support bracket is of a substantially L shape and has a side wall section and a base section, said plate filter actuator being associated with said side wall section and said screw filter actuator being associated with said base section, said plate filter actuator extending outward from said side wall section and in a plane substantially perpendicular to said base when in said operative position.

5. A universal light holder and filter actuator as defined in claim 4, wherein said base section includes an elongated opening wherein said screw filter actuator is removably inserted, the location of said screw filter actuator being adjustable within said elongated opening, said screw filter actuator being removed from said elongated opening when said plate filter actuator is in the operative position.

6. A universal light holder and filter actuator as defined in claim 5, wherein:
   said plate filter actuator includes a hole therein; and
   a thumb screw extends through said hole for threaded association with said side wall section of the support bracket, said thumb screw releasably securing said plate filter actuator to said side wall section in said operative and in-operative positions, said plate filter actuator being rotatable around said thumb screw to move from said operative position to said inoperative position when said thumb screw is released from its secure association with said side wall section.

7. A universal light holder and filter actuator for Super 8 cameras having a built-up filter actuated from within a slotted opening or threaded hole comprising:
   a support bracket;
   a plate filter actuator sized to fit within said slotted opening, said plate filter actuator extending from said support bracket when in an operative position, said plate filter actuator having a hole therein;
   a screw filter actuator disposed on said support bracket and dimensioned to screw into said threaded hole of said camera, said plate filter actuator having an in-operative position to permit said screw actuator to be used, said filter actuators being capable of disengaging said built-in filter of said Super 8 cameras and permitting the use of the Super 8 camera indoors with Super 8 film and with artificial lighting;
   a thumb screw threadedly associated with said support bracket and extending through the hole of said plate filter actuator, said thumb screw releasably securing said plate filter actuator in an operative position and in said in-operative positions, said plate filter actuator being rotatable around said thumb screw when moving from said operative to said in-operative position; and
   a light holder associated with said support bracket and having means thereon for mechanically and electrically associating an external lamp thereto to be used when either said plate filter actuator or said screw filter actuator has disengaged said outdoor filter.

8. In a universal filter actuator and light holder for cameras having an entrance way to a built-in filter from within a slotted opening or threaded hole, a filter key comprising:
   a support bracket;
   a plate filter actuator disposed on said support bracket and sized to fit within said camera slotted opening, said plate filter actuator extending out from said support bracket when in an operative position;
   securing means for releasably securing said plate filter actuator to said support bracket;
   a screw filter actuator associated with said support bracket and being dimensioned and disposed to screw into said camera threaded hole, said plate filter actuator having an in-operative position to permit said screw actuator to be used, said screw filter actuator being adjustable to permit said plate filter actuator to be used when in an operative position said filter actuators being capable of disengaging said built-in filter of said camera to permit the use of the same indoors with artificial lighting.

References Cited
UNITED STATES PATENTS

| | | | |
|---|---|---|---|
| 2,614,471 | 10/1952 | Markowitz | 95—86 |
| 3,149,549 | 9/1964 | Schroth | 95—86 |
| 3,289,563 | 12/1966 | Kent | 95—86 |

NORTON ANSHER, *Primary Examiner.*

R. M. SHEER, *Examiner.*